(12) United States Patent
Singal et al.

(10) Patent No.: US 10,250,397 B1
(45) Date of Patent: *Apr. 2, 2019

(54) VALIDATING CERTIFICATE CHAINS FOR BOTH INTERNAL AND PUBLIC FACING SERVER USING UNIFIED INTERFACE

(71) Applicant: DigiCert, Inc., Lehi, UT (US)

(72) Inventors: Padam Singal, Freemont, CA (US); Deepa Priya Ramachandran, Sunnyvale, CA (US)

(73) Assignee: DigiCert, Inc., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,718

(22) Filed: Sep. 19, 2017

Related U.S. Application Data

(63) Continuation of application No. 14/478,543, filed on Sep. 5, 2014, now Pat. No. 9,787,477.

(51) Int. Cl.
*H04L 29/06* (2006.01)
*H04L 9/32* (2006.01)

(52) U.S. Cl.
CPC .......... *H04L 9/3268* (2013.01); *H04L 9/3265* (2013.01); *H04L 63/0823* (2013.01)

(58) Field of Classification Search
CPC .............. H04L 63/0823; H04L 63/166; H04L 2209/80; H04L 63/0227; H04L 63/12; H04L 9/3265; H04L 2463/061; H04L 41/046; H04L 41/0806; H04L 41/0869; H04L 63/062; H04L 2209/34; H04L 2209/56; H04L 2209/76; H04L 63/04; H04L 63/105; H04L 63/20; H04L 9/3226; H04L 9/3263; H04L 9/3271; H04L 63/0428; G06F 21/33

See application file for complete search history.

(56) References Cited

U.S. PATENT DOCUMENTS

| 6,134,550 | A | 10/2000 | Van Oorschot |
| 7,444,509 | B2* | 10/2008 | Nadalin ................ H04L 9/3263 713/156 |
| 2005/0278534 | A1* | 12/2005 | Nadalin ................ H04L 9/3263 713/175 |
| 2006/0206707 | A1* | 9/2006 | Kostal ..................... G06F 21/33 713/156 |
| 2009/0327696 | A1* | 12/2009 | Hatlelid .............. H04L 63/0823 713/151 |

(Continued)

*Primary Examiner* — Abiy Getachew
(74) *Attorney, Agent, or Firm* — Knobbe, Martens, Olson & Bear LLP

(57) ABSTRACT

Embodiments presented herein provide a validation service used to validate a certificate chain for both public facing servers as well as internal, non-public facing servers. To validate a certificate chain, the client generates a request with the network address and sends it to the validation service. In response, the validation service attempts to establish a connection with the server at the network address. If successful, the validation service receives a certificate chain from the server and can verify that the certificate chain is complete, valid, and chains to a trusted root. If the validation service cannot connect to the network address identified in the request, then the validation service sends a local validation component to the requesting client. The local validation component executes from the client and validates the certificate chain presented by the network server.

19 Claims, 5 Drawing Sheets

(56) References Cited

U.S. PATENT DOCUMENTS

| | | |
|---|---|---|
| 2010/0031338 A1 | 2/2010 | Poore |
| 2013/0138952 A1* | 5/2013 | Berggren .............. H04L 9/3263 713/156 |
| 2014/0032913 A1* | 1/2014 | Tenenboym ............ H04L 9/321 713/176 |

* cited by examiner

VALIDATING CERTIFICATE CHAINS FOR BOTH INTERNAL AND PUBLIC FACING SERVER USING UNIFIED INTERFACE

CROSS-REFERENCE TO RELATED APPLICATIONS

This application is a continuation of U.S. patent application Ser. No. 14/478,543, filed Sep. 5, 2014 and is herein incorporated by reference in their entirety.

BACKGROUND

Field

Embodiments of the invention generally relate to techniques to validate a certificate chain. More specifically, embodiments presented herein provide techniques to validate a certificate chain for both public and internal server systems that use digital certificates to establish secure communication sessions with clients.

Description of the Related Art

Providing secure communication and protecting sensitive data is a well-known issue in a broad variety of contexts. For example, it is common for computer servers to use digital certificates to associate a server with a network domain. In such cases, clients use information contained in a certificate to verify the identity of a server and to establish a secure communication session with that server (e.g., an SSL or TLS session). More generally, digital certificates and public key infrastructure (PKI) techniques are used to create, distribute, and manage cryptographic keys used in a variety of contexts.

Typically, part of establishing a secure communication session with a server includes verifying that a certificate presented by the server is digitally signed by a "trusted" certificate authority. More specifically, digital certificates include a subject field that identifies the individual or server to which the certificate was issued (i.e., the entity associated with the public key listed the digital certificate). Digital certificates also include an issuer field identifying the certification authority (CA) certifying the identity of the subject. When a server presents a digital certificate, the client can verify whether the issuing CA signing that certificate is "trusted." The process of verifying the authenticity and validity of a newly received certificate involves checking all of the certificates in a chain of certificates from the certificate presented by a server, through any intermediate CAs, until reaching a certificate issued and signed by CA trusted by the client. A certificate presented to a client is trusted only if each certificate in that certificate's chain is properly issued and valid.

If the server does not present all of the certificates in the chain (along with the end-entity certificate), the client may be unable to verify the chain to a trusted root. Even if all the certificates in the chain are presented, if any of the certificates are no longer valid (or revoked) or if the chain does not reach a "trusted root," then the client may decline to establish a secure session with the server (or at least present a warning to a user).

Given the possibility for poor user experience with misconfigured or missing certificate chains, tools are available that allow an administrator configuring a server to validate a certificate chain presented by that server. However, to do so, the server needs to be reachable by a validation service. This presents a problem for servers that are visible only on private networks (e.g., only from within an enterprise network) as well as for servers that, while public facing, are behind a load balancer or firewall. For example, consider a web-site operator that deploys a pool of servers in a data center to host a website and that a load balancer distributes requests from clients to servers in the pool. In such a case, it would be preferable for the operator to validate that the certificate chain on each web server in the pool is configured correctly. However, because the servers in the pool are not directly visible to an external validation tool (despite providing a public-facing service), such a validation tool cannot verify the certificate chain for these servers.

SUMMARY

One embodiment presented herein includes a method to validate a certificate chain. This method may generally include receiving, by a validation service, a request to validate a certificate chain, wherein the request specifies a network server. Upon determining the network server is accessible by the validation service, a first network connection with the network server is established. In addition, the certificate chain associated with one or more digital certificates presented to the validation service by the network server is validated. Upon determining the network server is inaccessible by the validation service, a local validation component is sent to a requesting client. The local validation component establishes a second network connection with the network server and validates a certificate chain associated with one or more digital certificates presented to the local validation component by the network server.

In a particular embodiment, the method further includes presenting a validation report to the requesting client indicating whether the certificate chain is valid or invalid. And a valid certificate chain includes a chain of certificates between an end-entity certificate, one or more intermediate certificates, and a trusted root certificate.

Another embodiment includes a computer-readable storage medium storing instructions, which, when executed on a processor, perform an operation to validate a certificate chain. This operation may generally include receiving, by a validation service, a request to validate a certificate chain, wherein the request specifies a network server. Upon determining the network server is accessible by the validation service, a first network connection with the network server is established. In addition, the certificate chain associated with one or more digital certificates presented to the validation service by the network server is validated. Upon determining the network server is inaccessible by the validation service, a local validation component is sent to a requesting client. The local validation component establishes a second network connection with the network server and validates a certificate chain associated with one or more digital certificates presented to the local validation component by the network server.

Still another embodiment includes a system having a processor and a memory hosting an application, which, when executed on the processor, performs an operation to validate a certificate chain. This operation may generally include receiving, by a validation service, a request to validate a certificate chain, wherein the request specifies a network server. Upon determining the network server is accessible by the validation service, a first network connection with the network server is established. In addition, the certificate chain associated with one or more digital certificates presented to the validation service by the network server is validated. Upon determining the network server is inaccessible by the validation service, a local validation component is sent to a requesting client. The local validation component establishes a second network connection with the network server and validates a certificate chain associated with one or more digital certificates presented to the local validation component by the network server.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
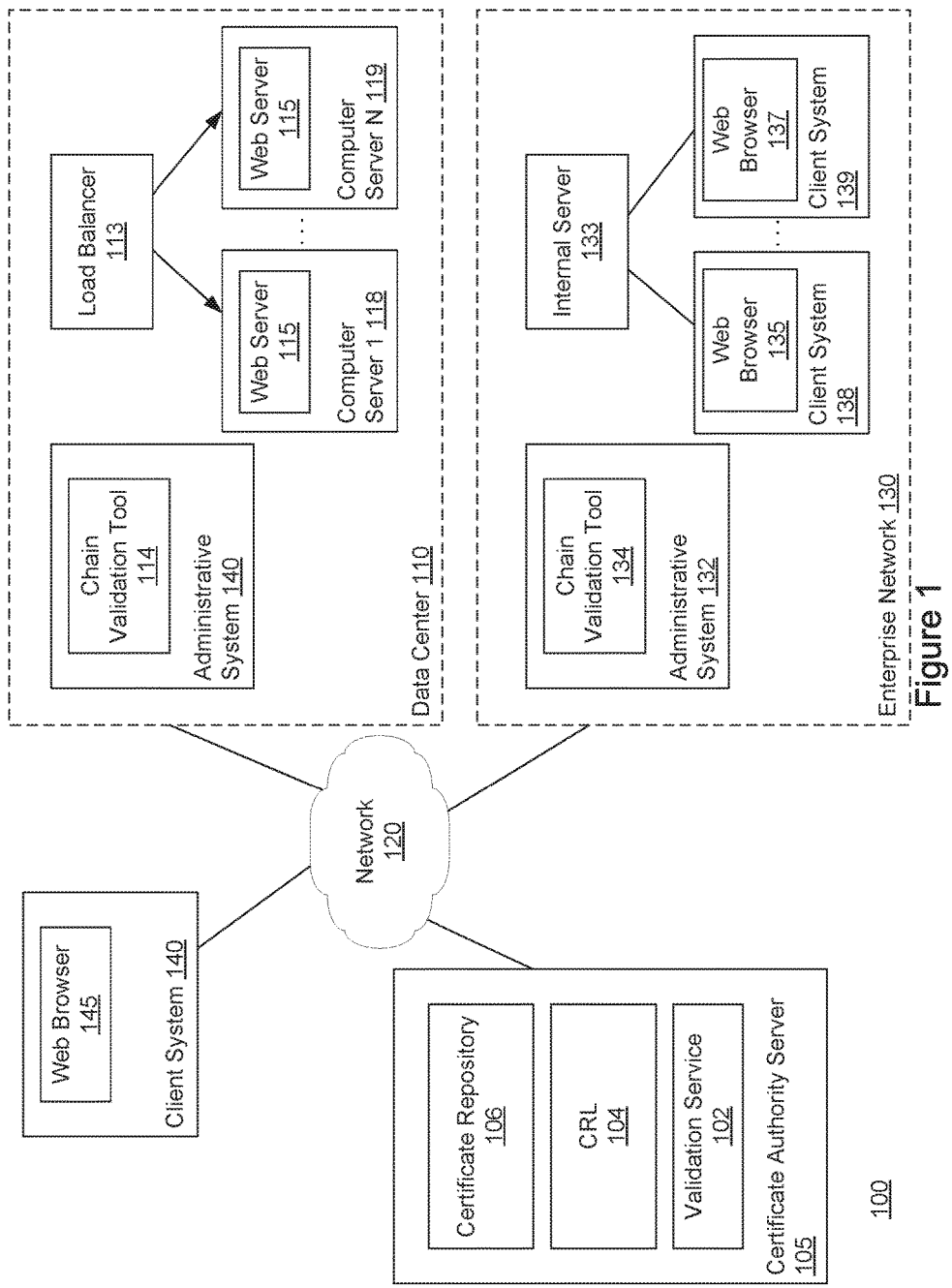
FIG. 1 illustrates an example computing environment, according to one embodiment.

Embodiments presented herein provide techniques for validating a digital certificate chain. In particular, embodiments presented herein provide a validation service that clients may use to validate a certificate chain for both public facing servers (e.g., a web-server with a public IP address) as well as internal, non-public facing servers. For example, a web-server may be hosted on a private enterprise network. In other cases, a server (or pool of servers) may provide a public facing service, but not be reachable directly over public networks (i.e., the internet). For example, a pool of web-servers hosting a website for a given URL may be deployed behind a load-balancing server. In such cases, a request to establish a secure connection over that URL is initially received by the load balancer and passed to one of the servers in the pool. That server responds to the request by presenting a digital certificate to the client and initiating a handshake process to establish a secure session. However, in this case, the validation service is unable to target a specific server in the pool, or even know which server in the pool the load balancer forwarded a request to.

To validate a certificate chain, a user visits a CA portal hosting the validation service (e.g., using a client application or web-browser). The user supplies a network address (and port if needed) of a server with a certificate chain to be validated. For example, the user may supply a publically routable IP address (in the case of a public server) or a network address that is only visible on a network of a client accessing the validation service (in case of an internal server).

In either case, the client generates a request with the network address and sends it to the validation service (e.g., a RESTful request). In response, the validation service attempts to establish a network connection with the server at the network address. If successful, the validation service receives a certificate chain from the server and can verify that the certificate chain is complete, valid, and chains to a trusted root. After validating the certificate chain, the service then reports to the client whether the chain is valid and correct or reports any errors identified during the validation attempt. For example, the service may generate a JSON response sent to the client.

If the validation service cannot connect to the network address identified in the request, then the validation service sends a local validation component to the requesting client. For example, the local validation component may be a combination of a Java library and javascript executed by the client browser. The local validation component executes from the client and attempts to reach network server at the network address specified in the request. Upon establishing a network session with the server at the network address (e.g., after performing an SSL handshake), the local validation component validates a certificate chain presented by the network server and reports to the client whether the certificate chain was valid.

Note, embodiments of the invention are described below using a web-server as an example of an application that uses SSL certificates to secure communications between that web-server and client systems. One of ordinary skill in the art will recognize that embodiments described herein may be adapted to work with a variety of computing applications which use digital certificates, and associated certificate chains, to assert an identity to clients and to establish secure communication sessions with those clients. For example, embodiments may be used with virtualized systems and infrastructure, stand-alone computing appliances, network devices, data storage devices, etc.

FIG. 1 illustrates an example computing environment 100, according to one embodiment. As shown, the computing environment 100 includes a certificate authority (CA) server 105, a data center 110, an enterprise network and a client system 140, each connected to a network 120 (e.g., the internet).

As shown, the CA server 105 includes a validation service 102, a certificate revocation list 104, and a certificate repository 106. The CA server 105 is included to be representative of a physical computing system, as well as representative of virtual machine instances deployed to a computing cloud. The certificate repository 106 stores digital certificates signed and issued by the CA (or by a intermediate certificate authority subordinate to the CA). The CRL 104 generally corresponds to a list of any certificates that, while within a validity period, have been expressly revoked by the subject identified in the certificate or by the CA.

Validation service 102 provides a network available service that clients may use to validate a certificate chain on both pubic facing servers and on internal servers. In one embodiment, the validation service 102 may attempt to reach a network address specified by a client (e.g., chain validation tool 114 or 134) and validate a certificate chain presented by a server at that network address. If the validation service 102 cannot reach the network address specified by the requesting client, then the service sends a local validation component to the client. The local validation component then attempts to connect to the network address in the request and validate a certificate chain presented by the server at that network address. Note, to the requesting client (e.g., chain validation tool 114, 134), the process may generally be transparent. That is, regardless of whether the validation service 102 reaches the server at the network address or sends the local validation component to the client to validate a certificate chain, the client simply sends the validation service 102 a network address to validate. The client is then presented with a response indicating that a valid certificate chain was presented by the server or a report of errors in the certificate chain.

As shown, data center 110 includes an administrative system 112, a load balancer 113, and computer servers 118, 119. In this example, load balancer 113 receives requests from clients (e.g., client system 140 and browser 145). The load balancer 113 distributes the requests to the computer servers 118, 119. That is, web-servers 115, 117 provide a public facing service but may lack a publically reachable network address. Instead, a domain name of the website (e.g., www.symantec.com) resolves to a public network address associated with the load balancer 113. Thus, the computer servers 118, 119 may be unreachable directly via either the domain name or by an IP address used by computer servers 118, 119.

Web-servers 115, 117 are included to be representative of a variety of web-sever applications (e.g., apache, nginix, etc.) configured to communicate with client systems using HTTP and related protocols. Web-server 115 may also communicate with other applications or systems in data center 110, such as an application server and a database to respond to requests from clients 140.

As part of doing so web-servers 115, 117 may include an end-entity digital certificate (e.g., an SSL certificate) used to associate the domain name of the website with the servers 118, 119 and in establishing secure connections with clients 140. Each web server 115, 117, may also store any certificates in a certificate chain associated with the end-entity certificate. Client system 140 is generally included to be representative of a general purpose computing system, such as a desktop or laptop computer configured with a web-browser 145 as well as mobile computing devices such as smart phones and computing tablets.

The administrative system 112 is included to be representative of a computing system used to configure and manage other systems in the data center 110. As shown, the administrative system 112 includes chain a validation tool 114 used to send chain validation requests to the validation service 102. The chain validation tool 114 provides a software application used to validate a certificate chain, such as a certificate chain associated with an SSL certificate installed on web-servers 118, 119. In one embodiment, the chain validation tool 114 may be an application installed on the administrative system 112. Alternatively, the chain validation tool 114 may be a web-based application accessed by a web browser on the administrative system 112.

As shown, enterprise network 130 includes an administrative system 132, an internal server 133, and client systems 138, 139. In this example, the internal server 133 is included to be generally representative of a computing system hosting a network service (e.g., a web server, application server, and a database) accessed by client systems connected to the enterprise network 130. In this example, the internal server 133 is accessible only over enterprise network 130 (or a VPN connection to enterprise network 130). Client systems 138, 139 access internal server 133 using web-browsers 135, 137 respectively, over the enterprise network 130. In one embodiment, internal server 133 may use a digital certificate (and associated certificate chain) to both assert an identity to client systems 138, 139 and to establish secure communication sessions with web-browsers 135, 137.

Administrative system 132 is included to be representative of a computing system used to configure and manage computing and network systems in the enterprise network 130. As shown, the administrative system 132 includes a chain validation tool 132 used to send chain validation requests to the validation service 102. Chain validation tool 134 provides a software application used to validate a certificate chain associated with an end-entity certificate installed internal server 133. Chain validation tool 134 may be an application installed on the administrative system 132 or web-based application accessed by a web browser on administrative system 132.

Figure 2:
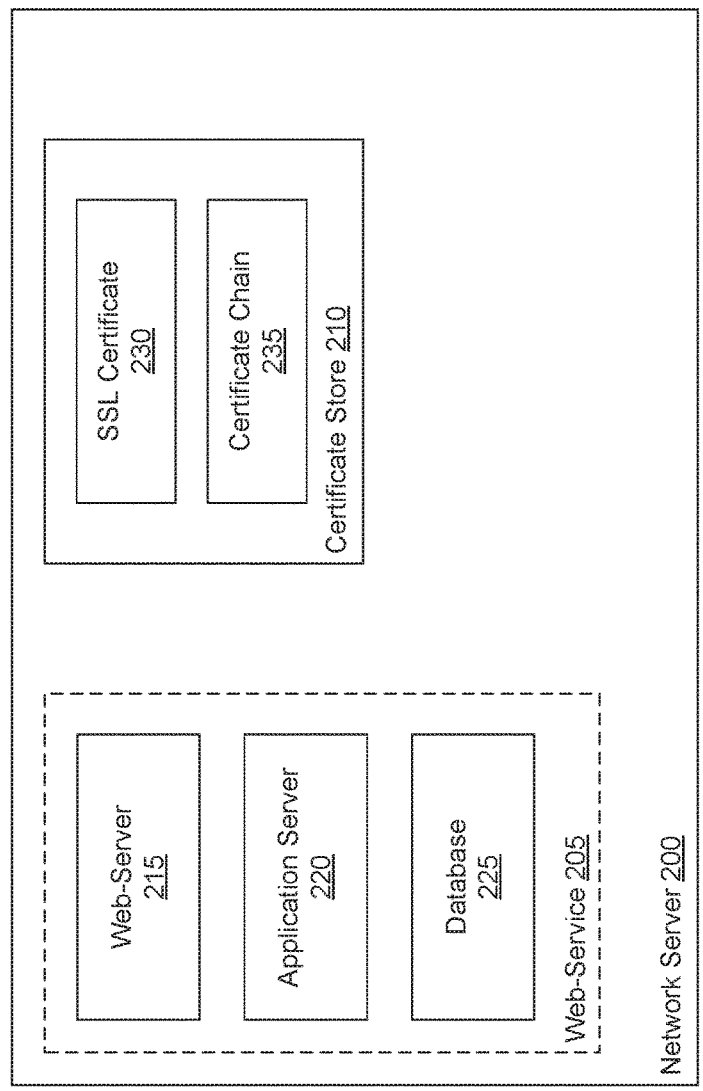
FIG. 2 illustrates components of a network server, according to one embodiment.

FIG. 2 illustrates components on a network server 200, according to one embodiment. The network server 200 generally corresponds to a computing system that provides a public facing service (e.g., web servers 115, 117) or an internal server providing a service to clients on an enterprise network (e.g., an internal server 113).

As shown, network server 200 includes a web-service 205 and a certificate store 210. In this example, the web-service 205 is implemented using a web-server 215, application server 220 and a database 225. Typically, the web-server 215 receives requests from clients, e.g., https requests, which may be passed to application server 220. The application server 220 processes the request, e.g., by retrieving or updating data in database 225. The application server 220 then generates a response (e.g., an HTML formatted document) passed back to the client by web-server 215. Of course, one of ordinary skill in the art will recognize that the example of FIG. 2 is just one of many possible configurations for providing web-service 205. As part of providing web-service 205, SSL certificate 230 may be used by the network server 200 to both prove identity (in this context, to prove that network server 205 is the legitimate source of web-service 205) as well as to establish secure a communication session with the web-server 215. As noted, a client may also verify that SSL certificate 230 is either issued by a trusted CA, or more typically, that SSL certificate 230 chains to a trusted root through a series of one or more intermediate certificates.

When a client requests to establish a secure session, the web-server 215 presents the client with SSL certificate 230 and certificate chain 235. This allows a client to both establish the secure communication session (in part using the public key listed in SSL certificate 230 as well as verify whether the SSL certificate 230 should be trusted, because this certificate chains to a trusted root, verified by the client using certificates in certificate chain 235.

Figure 3:
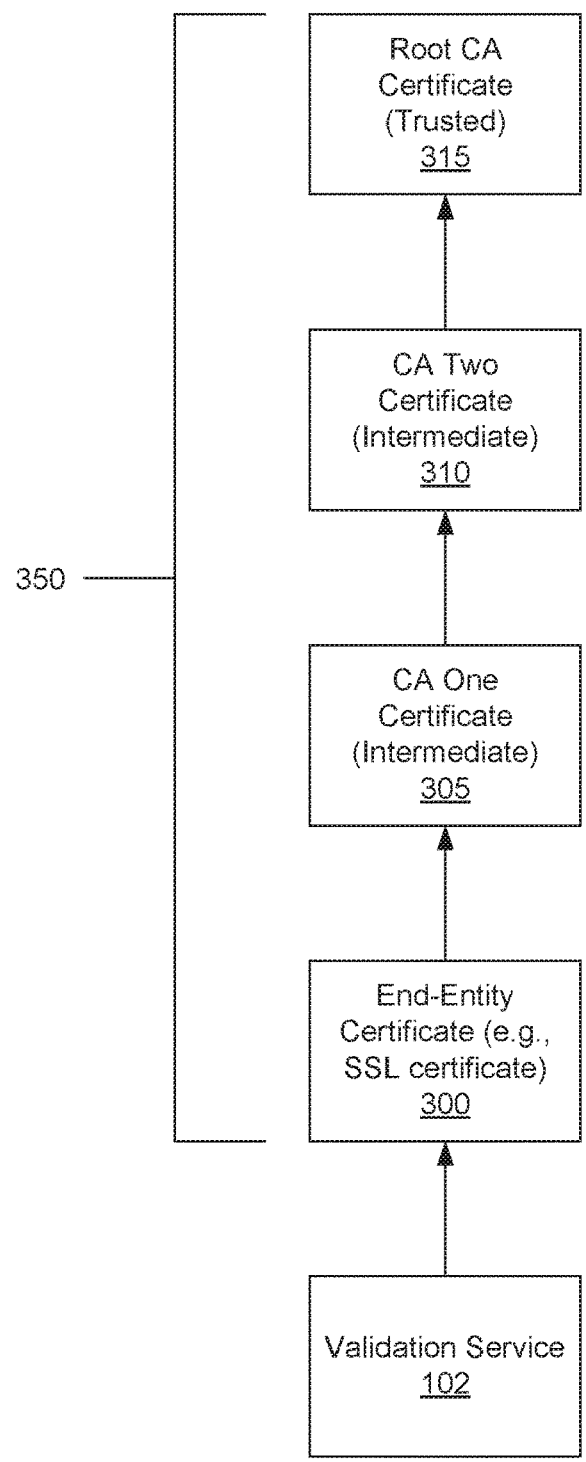
FIG. 3 illustrates an example certificate chain, according to one embodiment.

FIG. 3 illustrates an example of a certificate chain 350, according to one embodiment. As shown, the certificate chain 350 begins with an end-entity certificate 300 (e.g., an SSL certificate). Certificate 300 is issued (and signed by) a first intermediate CA. CA one itself proves its identity with certificate 305. In turn, Certificate 305 is issued (and singed by) a second intermediate CA. CA two proves its identity with certificate 310. Certificate 310 is issued (and signed by) a trusted root CA. Root CA proves its identity with a self-signed certificate 315.

To validate the certificate chain 350, the validation service 102 initiates a connection to a network server, which presents the end-entity certificate 300, and may also present validation service 102 certificates 305, 310, and 315. The validation service 102 first verifies the signature signing end-entity certificate 300 (i.e., a signature from the first intermediate CA). Provided the signature is valid, the validation service determines whether the first intermediate CA is trusted. If not, then the validation service 102 verifies the signature signing CA one certificate 305 (i.e., a signature from the second intermediate CA). Provided the signature is valid, the validation service 102 determines whether the second intermediate CA is trusted. If not, then the validation service 102 verifies the signature signing CA two certificate 310 is valid (i.e., a signature from the root CA). Provided the signature is valid, the validation service 102 determines whether it can chain from the end-entity certificate to a trusted root certificate in a certificate store maintained by the validation service. Assuming the certificate chains to a trusted root CA certificate, then the validation service 102 can confirm that the certificate chain 350 is correct. That is, the validation service can confirm that each certificate chain 350 is currently valid (and not revoked) as well as that the end-entity certificate 300 ultimately chains to a trusted root (as proven by certificates 305 310, and 315) in this example. Note, the validation service 102 may also confirm whether the certificate chain presented by the network server was complete. That is, the certificate chain 350 presented to the validation service 102 includes the end-entity certificate 300 as well as each certificate needed to perform the validation process (i.e., certificates 305, 310, and 315 in this example). Doing so may be needed for certain legacy clients that are unable to dynamically pull an issuer's certificates if it is not included in a certificate chain as well as for some network-enabled devices with limited processing capability (e.g., appliances, televisions, thermostats, etc., sometimes referred to as "the internet of things").

Figure 4:
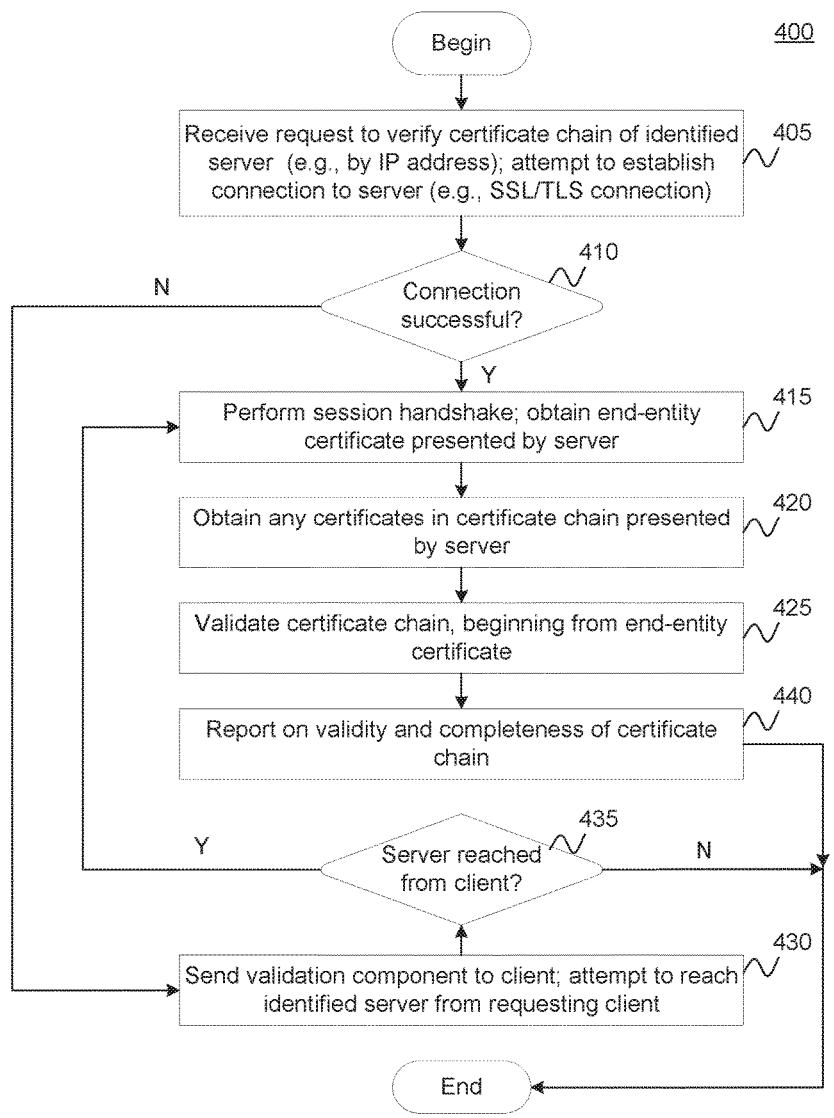
FIG. 4 illustrates a method for validating certificate chains for both internal and public facing servers using a unified interface, according to one embodiment.

FIG. 4 illustrates a method 400 for validating certificate chains for both internal and public facing servers using a unified interface, according to one embodiment. As shown, the method 400 begins at step 405 where a validation service receives a request to verify certificate chain of a specified network server. For example, an administrator may use a chain validation tool 114 to supply a network address of a publically visible server or a network address of a public-facing service provided by an internally facing server (e.g., of web-servers 118, 119). In response, the validation service 102 attempts to establish a network connection with the identified server (e.g., an SSL/TLS connection).

At step 410, the validation service determines whether the attempt to establish a connection was successful. If so, at step 415, the validation service performs a session handshake (e.g., an SSL handshake) over the established connection. As part of doing so, the validation service obtains an end-entity certificate, such as an SSL certificate, presented by the server (at 415) and obtains any certificates in a certificate chain needed to trace the end-entity certificate to a trusted root (at 420). At step 425, the validation service validates the certificate chain, beginning from the end-entity certificate. As described, the validation service can confirm the status of each certificate as being within a validity period (and as being not revoked). In addition, the validation service can determine whether the certificates obtained at 415 and 420 include a complete set of certificates as needed to chain from the end-entity certificate to a trusted root. Note, the certificates obtained at 415 typically do not include the certificate of a trusted CA. Instead, the validation service maintains a collection of trusted root certificates. At step 440, the validation server can report on the validity and completeness of the certificate chain for the identified server.

Returning again to step 410, if the validation service cannot establish a connection with the server identified by the requesting party at step 405, e.g., because the server identified at step 405 is not a public facing server. Then the validation service sends a local validation component to the requesting client. As described above, e.g., the validation service may send a combination of a Java library and javascript to be executed by a web-browser communicating with the validation service. Of course, the local validation component could be implemented using a variety of techniques. At step 435, the local validation component attempts to establish a connection with the network server identified at step 405. If the local validation component cannot reach the identified network server, then the validation service reports an error. Otherwise, if the local validation component can reach the network server identified at step 405, then the local validation component performs steps 415, 420, 425, and 440, as described above. That is, the local validation component attempts to perform a secure session handshake with the identified server and in response, is presented an end-entity certificate and one or more certificates in a certificate chain (steps 415, 520, 425). The local validation component then determines whether the chain is valid and whether the chain is complete (step 430). The local validation component then reports on the validity and completeness of the certificate chain (step 440). As described, the chain validation tool and validation service simplifies the administration of digital certificates by providing a unified interface for validating a certificate chain for both public facing servers (via the yes branch of step 410) and for internal servers (via the no branch of step 410).

Figure 5:
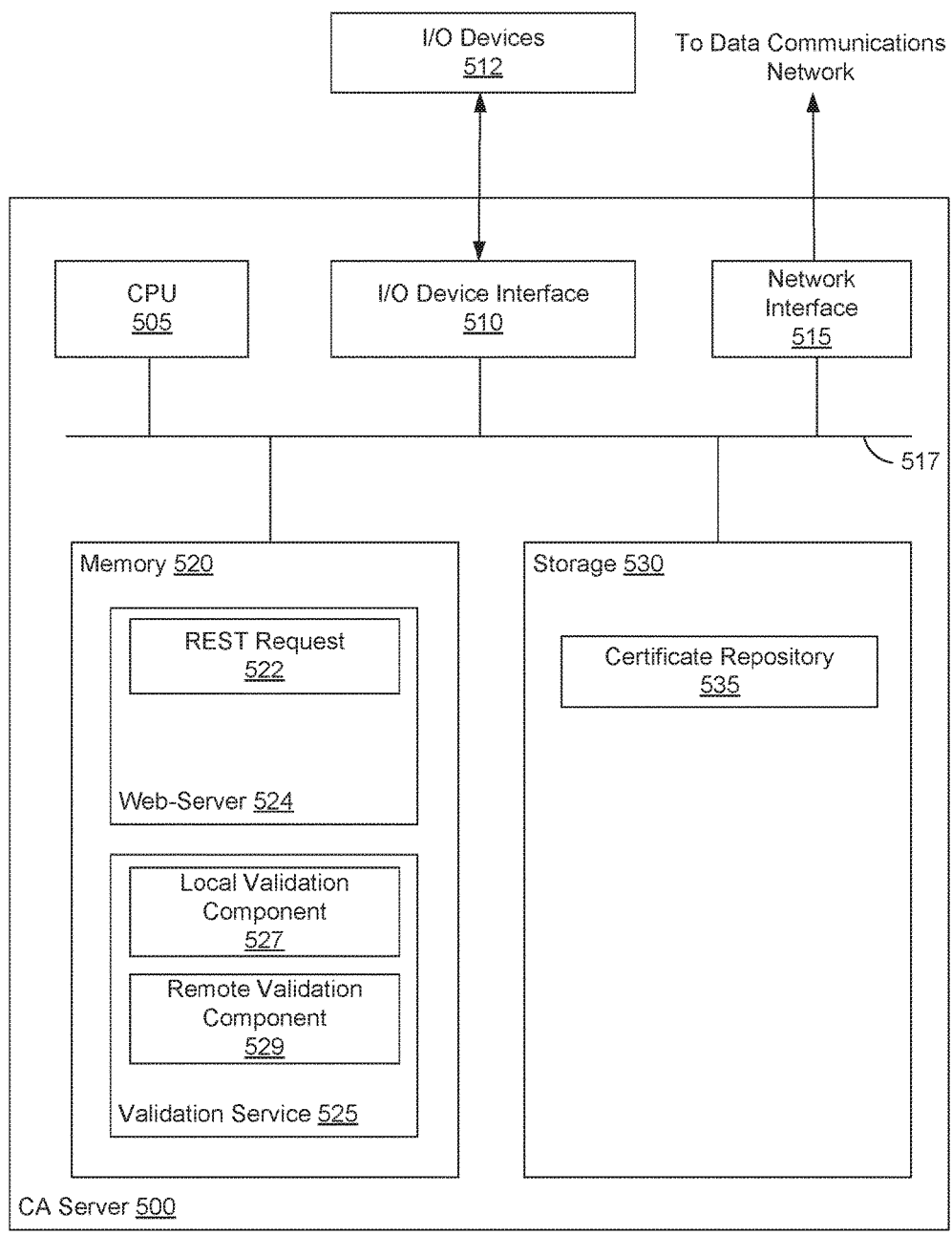
FIG. 5 illustrates an example computing system configured to validate a certificate chain for both internal and public facing servers using a unified interface, according to one embodiment.

FIG. 5 illustrates an example computing system configured to validate a certificate chain for both internal and public facing servers using a unified interface, according to one embodiment. As shown, the computing system 500 includes, without limitation, a central processing unit (CPU) 505, a network interface 515, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, optical storage, network attached storage (NAS), or a storage area-network (SAN).

Illustratively, the memory 520 includes a REST request 522, a web-server 524, and a validation service 525, and storage 530 includes a certificate repository 535. In one embodiment, REST request 522 provides a URL that identifies a network address of a server computing system hosting a web service secured by an end-entity certificate (e.g., an SSL certificate). Web server 524 may pass the REST request to the validation service 525. In turn, the validation service 525 may determine whether the network server identified in the request is correct. That is, the validation service determines whether the end-entity certificate is either signed by a trusted root or chains through one or more intermediate certificates to a trusted root. The validation service may also determine whether each certificate in the chain is then currently valid and not revoked. Additionally, the validation service 525 may determine whether the certificate chain obtained from the identified network server is complete. That is, the validation service 525 determines whether the network server presented each certificate in the chain needed to trace from the end-entity certificate to a trusted root.

As shown, the validation service 525 includes both a local validation component 527 and a remote validation component 529. In one embodiment, the remote validation component 529 validates a certificate chain for a network server with a publically reachable network address. Certificates presented by the network server (or identified while performing the validation) may be stored in the certificate repository 535. The local validation component 527 provides executable components that the validation service 525 may send to a requesting party (e.g., chain validation tool 114, 134) when the REST request 522 identifies a network server not reachable by the validation service 525. In such cases, validation service 525 sends the local validation component 527 to the requesting party, which performs the validation process and reports the results of the certificate chain validation to the requesting party.

As described, embodiments presented herein provide techniques for validating a certificate chain. Advantageously, a requesting party can access the validation service via a unified interface, regardless of whether the network server is a public facing server or providing a public facing service without a public facing address (e.g., for a webserver in a pool of web-servers behind a load balancer). Similarly, the validation service can validate internal servers deployed to a private enterprise network.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a validation service may be hosted by a virtual computing instance in the cloud. The validation service can process requests to validate public facing servers by establishing a secure connection with a public facing server and validating a certificate chain associated with an end-entity certificate presented by the public facing server. Conversely, the validation service can validate certificate chains for network servers hosted by other virtual machine instances. Similarly, the validation service hosted on the virtual computing instance can send a requesting party a local validation component to validate a certificate chain for a server hosted at a network address that cannot be reached by the validation service directly.

While the foregoing is directed to embodiments of the present invention, other and further embodiments of the invention may be devised without departing from the basic scope thereof, and the scope thereof is determined by the claims that follow.

What is claimed is:

1. A computer-implemented method to validate a certificate chain, the method comprising:

receiving, by a validation service and from a requesting client, a request to validate a certificate chain, wherein the request specifies a network computing device;

determining, by the validation service, that the network computing device specified in the request is inaccessible to the validation service; and based at least in part on said determining that the network computing device is inaccessible to the validation service, sending, by the validation service, a local validation component to the requesting client, wherein the local validation component establishes a network connection with the network computing device and validates a certificate chain associated with one or more digital certificates presented to the local validation component by the network computing device.

2. The method of claim 1, further comprising, presenting a validation report to the requesting client indicating whether the certificate chain is valid or invalid.

3. The method of claim 1, wherein a valid certificate chain includes a chain of certificates between an end-entity certificate, one or more intermediate certificates, and a trusted root certificate.

4. The method of claim 1, wherein an invalid certificate chain includes at least one invalid or revoked certificate or does not include a trusted root certificate.

5. The method of claim 1, wherein an invalid certificate chain is missing at least one certificate in a chain of certificates between an end-entity certificate and a trusted root certificate.

6. The method of claim 1, wherein the request specifies a network address of the network computing device.

7. The method of claim 1, wherein the one or more digital certificates include an end-entity certificate installed on the network computing device and wherein the end-entity certificate lists a public key used to assert an identify of the network computing device and to establish secure communication sessions with clients of the network computing device.

8. A computer-readable non-transitory storage medium storing instructions, which, when executed on a processor, perform an operation to validate a certificate chain, the operation comprising:

receiving, by a validation service and from a requesting client, a request to validate a certificate chain, wherein the request specifies a network computing device;

determining, by the validation service, that the network computing device specified in the request is inaccessible to the validation service; and based at least in part on said determining that the network computing device is inaccessible to the validation service, sending, by the validation service, a local validation component to the requesting client, wherein the local validation component establishes a network connection with the network computing device and validates a certificate chain associated with one or more digital certificates presented to the local validation component by the network computing device.

9. The computer-readable non-transitory storage medium of claim 8, wherein the operation further comprises presenting a validation report to the requesting client indicating whether the certificate chain is valid or invalid.

10. The computer-readable non-transitory storage medium of claim 8, wherein a valid certificate chain includes a chain of certificates between an end-entity certificate, one or more intermediate certificates, and a trusted root certificate.

11. The computer-readable non-transitory storage medium of claim 8, wherein an invalid certificate chain includes at least one invalid or revoked certificate or does not include a trusted root certificate.

12. The computer-readable non-transitory storage medium of claim 8, wherein an invalid certificate chain is missing at least one certificate in a chain of certificates between an end-entity certificate and a trusted root certificate.

13. The computer-readable non-transitory storage medium of claim 8, wherein the request specifies a network address of the network computing device.

14. The computer-readable non-transitory storage medium of claim 8, wherein the one or more digital certificates include an end-entity certificate installed on the network computing device and wherein the end-entity certificate lists a public key used to assert an identify of the network computing device and to establish secure communication sessions with clients of the network computing device.

15. A system, comprising:

a processor; and a memory hosting an application, which, when executed on the processor, performs an operation to validate a certificate chain, the operation comprising:

receiving, by a validation service and from a requesting client, a request to validate a certificate chain, wherein the request specifies a network computing device, determining, by the validation service, that the network computing device specified in the request is inaccessible to the validation service; and based at least in part on said determining that the network computing device is inaccessible to the validation service, sending, by the validation service, a local validation component to the requesting client, wherein the local validation component establishes a network connection with the network computing device and validates a certificate chain associated with one or more digital certificates presented to the local validation component by the network computing device.

16. The system of claim 15, wherein the operation further comprises presenting a validation report to the requesting client indicating whether the certificate chain is valid or invalid.

17. The system of claim 15, wherein a valid certificate chain includes a chain of certificates between an end-entity certificate, one or more intermediate certificates, and a trusted root certificate.

18. The system of claim 15, wherein an invalid certificate chain (i) includes at least one invalid or revoked certificate or does not include a trusted root certificate or (ii) is missing at least one certificate in a chain of certificates between an end-entity certificate and a trusted root certificate.

19. The system of claim 15, wherein the request specifies a network address of the network computing device.

* * * * *